April 30, 1968    J. G. WURM    3,380,907
APPARATUS FOR THE ELECTROLYTIC REFINING OF NUCLEAR METALS
Filed Sept. 13, 1963    4 Sheets-Sheet 3

INVENTOR
Joseph G. WURM

ATTORNEYS

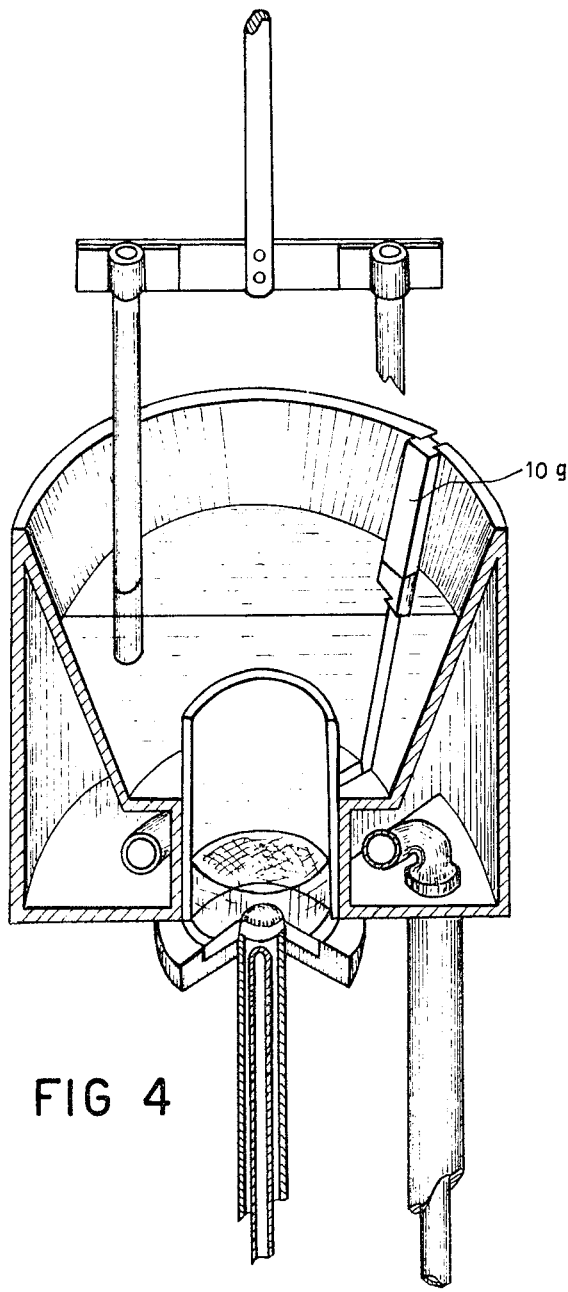

United States Patent Office 3,380,907
Patented Apr. 30, 1968

3,380,907
APPARATUS FOR THE ELECTROLYTIC REFINING OF NUCLEAR METALS
Joseph Gerard Wurm, Varese, Italy, assignor to European Atomic Energy Community—Euratom, Brussels, Belgium
Filed Sept. 13, 1963, Ser. No. 308,778
Claims priority, application Germany, Sept. 13, 1962, E 23,520
6 Claims. (Cl. 204—247)

ABSTRACT OF THE DISCLOSURE

The apparatus comprises an electrolysis vessel made of electrically conductive metal, such as copper, and formed as a double-walled internally cooled field concentrator intended to concentrate the energy from a high frequency induction coil, surrounding the apparatus, on the cathode metal. The said metal is placed in a crucible located at the bottom of the vessel and made of refractory material. The said cathode metal and the electrolyte above it are kept in a molten state by this energy. The copper vessel is concentrically mounted in a reaction chamber containing an inert atmosphere. The anode is dipped in the molten salt bath above the crucible. Operating with a salt charge of NaCl, KCl and $UCl_3$, a skull of solid salt mixture is formed on the inner wall of the cooled copper vessel whereby to avoid corrosion of the vessel.

---

This invention relates generally to the electrolytic refining of nuclear metals from salt melts of these metals. Nuclear metals include purely constructional metals such as Zr, Nb and Be as well as fissionable or fertile metals such as U, Th and Pu. They are present in the melt in the form of their halogen salts.

A special manner of refining metals consists in obtaining the metal out a solid electrode which is electrically connected as the anode and consists of the unpurified metal. The deposit electrode is then the cathode which consists of the pure metal or is at least coated therewith. The salt bath acts as a normal electrolyte. Since there is electrically no natural potential difference between the electrodes, the electrolytic process must be set into action by an external voltage source. The pure metal travels to the cathode and the impurities go into the salt melt.

The invention is particularly directed to an advantageous embodiment and development of the above described type of electrolytic refining.

The refining with pure and impure electrodes applies with particular advantage to metals such as uranium or plutonium. It can be used either for producing pure uranium from the halogenated impure carbide or oxide, or for the preparation of irradiated fuel elements with the fission products as impurities.

The salt melt electrolysis presents a series of operational problems. From the viewpoint of chemical technology these include protection of the salt melt from oxidation and absorption of moisture, protection of the electrolysis vessel against the corrosive attack of the melt, and the formation of dendrites at the cathode upon deposit of the separated metal. From the constructional viewpoint they include heating of the electrodes and accessibility of the apparatus.

A whole series of separate measures have been proposed for the solution of these problems. Constant spraying of the melt bath with inert protective gas is to prevent oxidation of the melt. Electrolysis vessels of graphite are not subject to corrosion by the salt melt. Dendrite formation is got around by liquid cathodes. Heating of the bath by induction saves separate heating furnaces etc. These measures have in part been successful. It is the object of the invention to utilize them, at least in effect, as far as possible together in a refining plant.

A refinery of this type is characterized in accordance with the invention in that the electrolysis vessel, made of electrically conductive metal, is concentrically mounted in the reaction chamber in transformer series with an HF induction winding surrounding the reaction chamber and operated with inert gas, the vessel being formed as a double wall, internally cooled field concentrator known per se and having a radial slot and a central bore, and in that the bore has set therein a melt crucible of refractory material projecting beyond the floor of the electrolyte vessel to form a collar, the crucible having on the floor thereof a layer of pure nuclear metal acting as cathode and a cathodic electrode projecting thereinto, and in that furthermore the anodic electrode (or electrodes) is arranged in the bath zone peripherally to the melt crucible, and in that the reaction chamber, preferably consisting of translucent material, is connected to a high vacuum pump. Through this combination of characteristics it is possible to provide for optimum conditions of operation. Thus uranium was experimentally molten at 1200–1250° C. which was nearly impossible with conventional electrolytic cells and with external heating.

The use of a field concentrator as electrolysis vessel makes possible first of all the concentration of electrical melting energy in the crucible zone, that is the cathode. The internal cooling of the concentrator gives the possibility of cooling the walls of the vessel which are in contact with the salt melt in such a way that a salt skull is formed.

The elemination of the usual furnace with its porous ceramic parts brings with it furthermore the great operational advantage that the apparatus can from the beginning of the operation be completely evacuated, so that any attack of oxygen on the melt and on the nuclear metal is prevented. Subsequent loading of the reaction chamber with inert protective gas ensures protection during operation.

The skull provides ideal protection of the vessel from corrosion without disturbing the transfer of heat energy into the bath. The melt crucible of refractory material (for example BeO or ceramics compounded with BeO) provides a liquid electrode and constitutes at the same time a melting and collecting basin for the separated nuclear metal. The dendrite problem is thereby surmounted. The projecting collar of the melt crucible cooperates with the peripheral arrangement of the anodic electrodes to provide a mechanical separating effect on the impurities.

An embodiment of the refinery according to the invention is illustrated by way of example in the accompanying drawings, in which:

FIG. 4 is a sectional perspective view of the electrolysis section according to FIG. 2.

Figure 1:
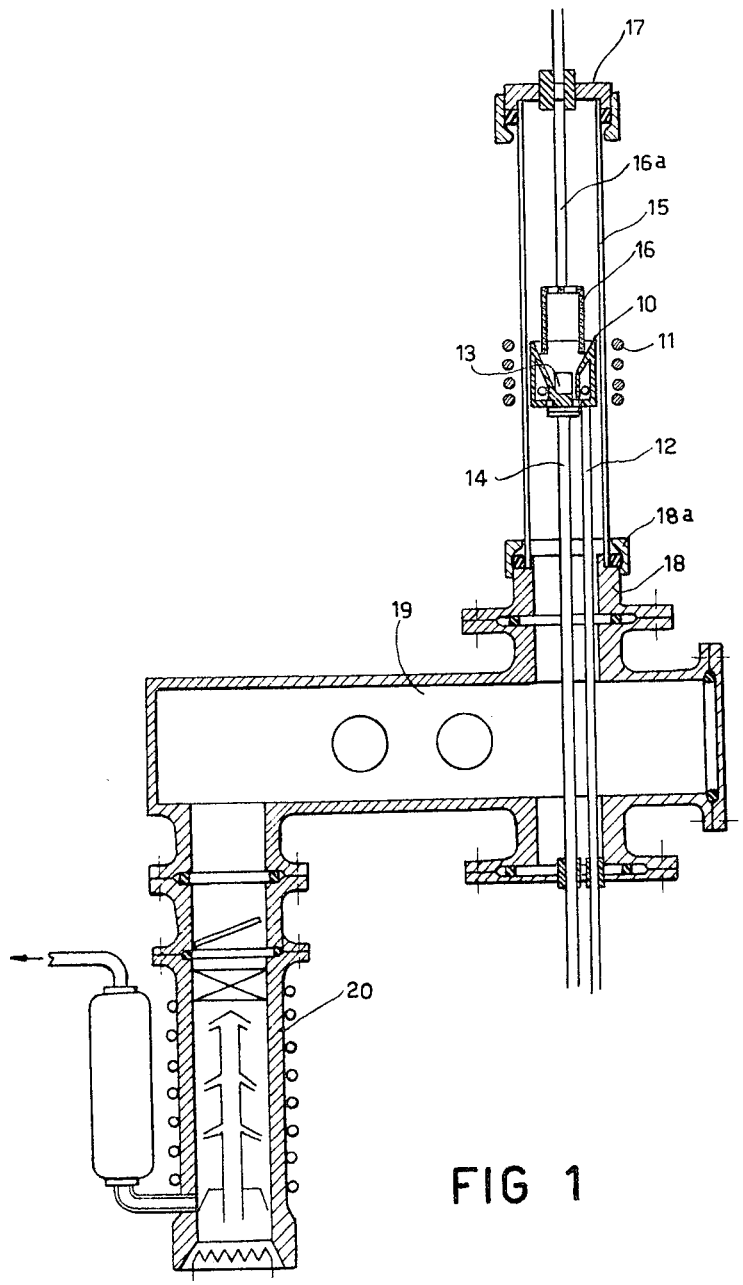
FIG. 1 is a longitudinal section of the apparatus.

In FIG. 1 numeral 10 indicates the electrolysis vessel, which is at the same time the field concentrator, 11 is the HF induction winding (connected to a 1.5 mHz. generator of 5 kw. yield), 12 is the cooling system (water) for the vessel or field concentrator, 13 the melt crucible which contains the cathode terminal, 14 the corresponding connecting electrode, 15 the reaction chamber constituted by a quartz tube, 16 the anode system consisting of a crown of rods supported by an adjustable holder rod 16a, 17 a vacuum closure cap with a Wilson seal at the upper end of the quartz tube, 18 a joint with a sealing collar 18a, 19 an intermediate container disposed at a right angle to the tube 15 for various purposes (leading out of the cooler conduits and of the cathode connection, connection of measuring conduits and control instruments, connection of pumps, insertion of a trap for cooling medium) and 20 is the diffusion pump section.

As clearly shown in FIG. 1 the electrolysis vessel 10 is concentrically disposed in the reaction chamber 15 and for heating purposes it is in transformer series with the HF induction winding 11. Details are explained hereinafter with reference to FIGS. 2 and 3.

The electrolysis vessel 10 is formed as a double-wall internally cooled field concentrator of copper. The inner wall 10c and outer wall 10e of vessel 10 are provided with means defining a radial slot 10a and the chamber defined by the inner wall 10c has a central bore 10b located centrally of the vessel. In induction furnaces, field concentrators have the function of bringing the electromagnetic field of the induction coil into the axial zone with a minimum of weakening and with local concentration. In the present case it is of value that the field is concentrated at the periphery of the bore 10b. The current flow in the concentrator required for this purpose is achieved by the radial slot 10a, which, to seal the vessel, is cemented with a corrosion resistant and refractory insulating material 10g as shown in FIG. 4. The current flow in the concentrator is indicated by the dotted line in FIG. 3.

The inner wall 10c of the field concentrator is inclined in the shape of a funnel. It is covered with the salt skull 10d; reference numeral 10f indicates the salt bath itself. The outer wall 10e of the concentrator is cylindrical and covers exactly the induction winding 11. The concentration effect on the melt crucible is heightened in that the internal bore 10b of the concentrator only extends over the possible level of cathode material 13b in the crucible.

Figure 3:
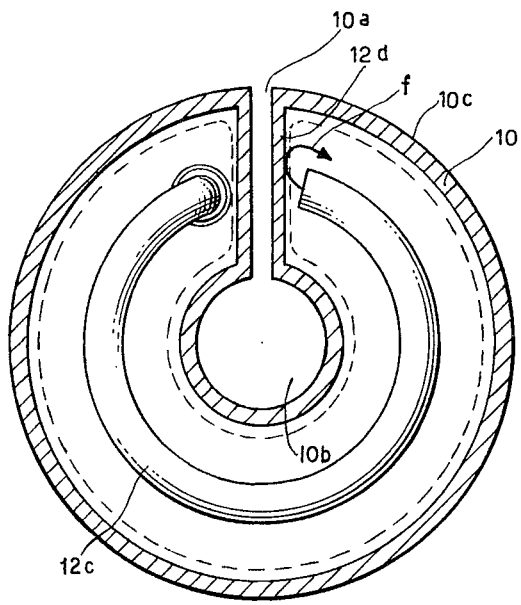
FIG. 3 is a cross section of the field concentrator of FIG. 2.

A further particularity of the arrangement as a whole lies in that the melt crucible and the field concentrator fit snug and flush at the bottom. The purpose of this characteristic is to avoid downward dissipation of the field, that is energy radiation. It is also preferable to pass the supply and outlet conduits 12a and 12b for the cooling medium and the cathode connection 14 to the concentrator and the melt crucible through the downward shielded space of the quartz tube. Furthermore the cooling system of the field concentrator is attuned to the electrical conditions in the concentrator, that is, also in the cooling system there is avoided an annular short-circuit of the secondary currents. As shown in FIG. 3 the elbow 12c of the cooling medium inlet pipe opens at its end opposite the side wall 12d of the concentrator. Arrow f indicates the flow direction of the cooling water. Aside from the formation of the skull, the cooling has the effect that the field concentrator and the reaction chamber only become lukewarm, which is of advantage from the operational standpoint.

As mentioned, the melt crucible 13 is mounted in the bore 10b of the field concentrator. The crucible is made of BeO and is set on a support and sealing washer 21 of ceramic material. The washer is secured to the field concentrator by clamps 22. The crucible projects with its upper collar portion 13a beyond the floor of the concentrator and thus forms an annular collecting basin at the outside. The anodes 16 are mounted in the zone vertically above this basin. The radial offset of the anodes with respect to the cathode has the effect that the heavy insoluble impurities (for example any noble metals) which are separated from the anode during electrolysis are deposited in the abovementioned collecting basin (sediment basin).

The anodes consist of the unpurified nuclear metal and the cathode of the same but pure nuclear metal. At the beginning of the electrolytic process the cathode is present in the crucible as a solid bottom layer.

Figure 2:
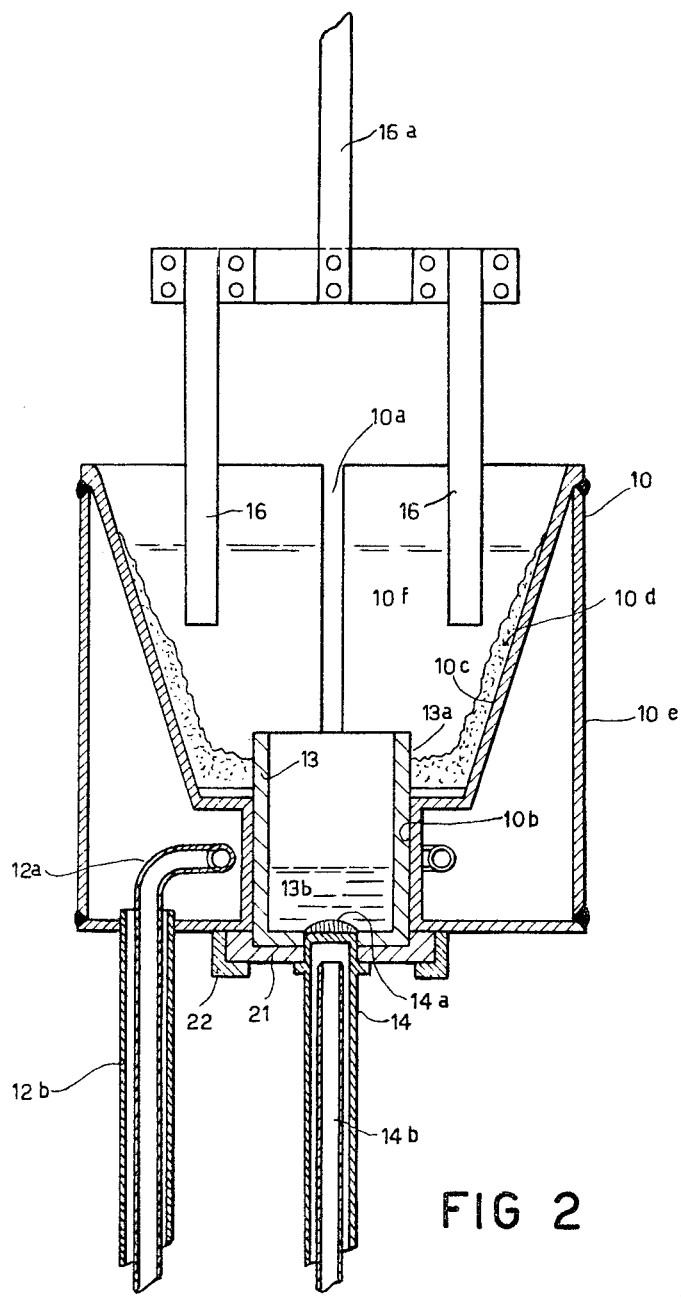
FIG. 2 is a detail longitudinal section on an enlarged scale of the electrolysis section, in particular the field concentrator.

As shown in FIG. 2, the connecting electrode 14, which has a head 14a of wolfram and is hollow, connects with the cathode. The electrode is water cooled and contains for this purpose a cooling medium supply pipe 14b. The electrode serves, together with the cooling pipes 12a and 12b, as support rod for the electrolysis section and can be displaced axially. The connecting electrode 14 can also be separately removed from the crucible 13, so as to provide a pouring opening for the removal of the pure nuclear metal produced.

The operation of the apparatus is as follows: At the beginning the reaction chamber is evacuated. Then the cooling system is switched on. At this time the electrolysis vessel is still empty while the melt crucible contains an initial charge of pure nuclear metal in solid state. In practice a disc of the metal concerned is placed as a charge in the crucible. The induction heater is then switched on and the nuclear metal is heated up to the melting point of the salt charge which has yet to be introduced. When this point is reached the suitably pretreated salt charge is introduced from above into the electrolysis vessel though a special filling pipe not illustrated in the drawings. The salt is gradually melted, with corresponding volumetric contraction, by the heat given off by the still solid cathode. In order to fill the available bath volume, salt is continuously added, while at the same time the cathode temperature is raised up to the melting point of the nuclear metal. The inductive heating on the one hand and the cooling output on the other hand are mutually adjusted in the disclosed starting procedure and during electrolysis in such a way that the bath is always sufficiently fluid while the required skull is formed and maintained at the wall of the bath.

With a cathode of uranium and a salt charge of

$$NaCl+KCl+UCl_3$$

the melting temperature of the cathode lies at about 1250° C. and that of the salt at about 750° C. The liquefaction and the formation of the skull can easily be observed through the quartz tube.

When liquefaction has started the electrolytic system, that is the direct current circuit, is switched on and the refining process begins. The gas resulting from the solution of the anode or, for irradiated fuel elements, the fission product gas, is continuously pumped off. It is not excluded that during the electrolysis alkalies, earth alkalies and rare earths get into the cathode. Since, however, the cathode temperature lies in any case above the boiling point of the corresponding metals, these traces are again evaporated and go back into the salt melt. In this manner the resulting nuclear metal is automatically kept very pure.

I claim:

1. Apparatus for electrolytic refining of nuclear metals with the use of halogen salts of the metals as electrolyte, pure liquid nuclear metal as cathode and impure solid nuclear metal as anode, comprising a gas-tight reaction chamber, an electrolysis vessel of electrically conductive material concentrically disposed in said reaction chamber, an HF induction winding surrounding said reaction chamber, said vessel being in transformer series with said induction winding for heating purposes, said vessel being formed as a double-walled internally cooled field concentrator having an inner and an outer wall and means interconnecting said walls to define a radial slot, said inner wall defining a chamber having a central bore at the bottom thereof, a melt crucible of refractory material mounted in said bore and projecting beyond the floor of said electrolysis vessel to form a collar, a layer of pure nuclear metal in said crucible forming the cathode, a cathode electrode projecting thereinto, at least one anode electrode disposed in the electrolyte bath peripherally to said crucible, and means connecting said reaction chamber to a high vacuum pump.

2. Apparatus according to claim 1, wherein said field concentrator has its inner wall inclined as a funnel towards said collar and said radial slot is cemented with refractory material.

3. Apparatus according to claim 1, wherein said field concentrator and said melt crucible are sealed even and flush at the bottom to form a confined space underneath, said space containing cooling medium inlet and outlet conduits and a cathode connector.

4. Apparatus according to claim 1, wherein said anode consists of a crown of rigid longitudinally adjustable rods, with a common holder supporting said rods.

5. Apparatus according to claim 1, wherein said reaction chamber comprises a cylindrical upright tube of translucent quartz closed at the top by a Wilson seal for the passage of an anode connector and connected at the bottom with an intermediate container at right angle to said tube, said vacuum pump being connected with said container.

6. Apparatus according to claim 5, including means to displace said field concentrator and said melt crucible together or the latter separately into said intermediate container.

References Cited

UNITED STATES PATENTS

| 469,454 | 2/1892 | Rogers | 204—245 |
| 2,414,831 | 1/1947 | McNitt | 204—247 |
| 2,773,825 | 12/1956 | Newcombe | 204—274 |

FOREIGN PATENTS

| 483,882 | 6/1952 | Canada. |

JOHN H. MACK, *Primary Examiner.*

E. ZAGARELLA, *Assistant Examiner.*